US012670451B2

(12) United States Patent
Vlasov et al.

(10) Patent No.: US 12,670,451 B2
(45) Date of Patent: **\*Jun. 30, 2026**

(54) MANAGING DEPENDENCIES BETWEEN WORK ITEMS TRACKED BY A HOST SERVICE OF A PROJECT MANAGEMENT SYSTEM

(71) Applicants: Atlassian Pty Ltd., Sydney (AU); Atlassian US, Inc., San Francisco, CA (US)

(72) Inventors: Pavel Vlasov, Sydney (AU); Amy Dittmar, San Francisco, CA (US)

(73) Assignees: ATLASSIAN PTY LTD., Sydney (AU); ATLASSIAN US, INC., San Francisco, CA (US)

( \* ) Notice: Subject to any disclaimer, the term of this patent is extended or adjusted under 35 U.S.C. 154(b) by 69 days.

This patent is subject to a terminal disclaimer.

(21) Appl. No.: 18/412,386

(22) Filed: Jan. 12, 2024

(65) Prior Publication Data

US 2024/0152829 A1 May 9, 2024

Related U.S. Application Data

(63) Continuation of application No. 16/908,600, filed on Jun. 22, 2020, now Pat. No. 11,875,287.

(Continued)

(51) Int. Cl.
*G06F 3/04883* (2022.01)
*G06F 3/04817* (2022.01)
(Continued)

(52) U.S. Cl.
CPC . *G06Q 10/063112* (2013.01); *G06F 3/04817* (2013.01); *G06F 3/04883* (2013.01); *G06F 17/18* (2013.01); *G06Q 10/04* (2013.01); *G06Q 10/06316* (2013.01); *G06Q 10/103* (2013.01); *G06Q 10/109* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 5,548,506 A | 8/1996 | Srinivasan et al. | |
| D534,542 S | 1/2007 | Jewitt et al. | |

(Continued)

OTHER PUBLICATIONS

Cicala, https ://dokumen .pub/project-management-using-microsoft-project-2019-a-training-and-reference-guide-for-project-managers-using-standard-professional-server-web-application-and-project-online-for-offi ce-365-1077679432-9781077679436.html, 2019.

(Continued)

*Primary Examiner* — Tuyetlien T Tran
(74) *Attorney, Agent, or Firm* — Brownstein Hyatt Farber Schreck, LLP

(57) ABSTRACT

A computer implemented method comprising displaying a scheduling interface including a first work item user interface element corresponding to a first work item and a second work item user interface element corresponding to a second work item; detecting a create dependency interaction; and, in response to detecting the create dependency user interaction, creating a dependency relationship between the first and second work items.

20 Claims, 12 Drawing Sheets

Related U.S. Application Data

(60) Provisional application No. 62/976,562, filed on Feb. 14, 2020.

(51) Int. Cl.

| | |
|---|---|
| *G06F 17/18* | (2006.01) |
| *G06Q 10/04* | (2023.01) |
| *G06Q 10/0631* | (2023.01) |
| *G06Q 10/10* | (2023.01) |
| *G06Q 10/109* | (2023.01) |
| *G06F 3/04842* | (2022.01) |

(56) References Cited

U.S. PATENT DOCUMENTS

| | | | |
|---|---|---|---|
| 7,376,469 B2 | 5/2008 | Eischeid et al. | |
| 7,451,449 B2 | 11/2008 | Thompson et al. | |
| 8,099,312 B2 | 1/2012 | Jin et al. | |
| 8,387,066 B1 | 2/2013 | Becher et al. | |
| 8,671,007 B2 | 3/2014 | Chaar et al. | |
| 8,875,088 B1 | 10/2014 | Holler et al. | |
| D730,380 S | 5/2015 | Zhong et al. | |
| D740,312 S | 10/2015 | Heo et al. | |
| D741,879 S | 10/2015 | Chapman et al. | |
| 9,406,038 B2 | 8/2016 | Cantor et al. | |
| 9,501,753 B2 | 11/2016 | Cantor et al. | |
| D791,815 S | 7/2017 | Dzjind et al. | |
| D803,234 S | 11/2017 | Day et al. | |
| 10,719,336 B1 | 7/2020 | Tsybulnyk et al. | |
| 10,853,746 B2 | 12/2020 | Suntinger et al. | |
| 2003/0081013 A1* | 5/2003 | Allen ................... | G06F 3/0482 |
| | | | 715/853 |
| 2003/0187670 A1 | 10/2003 | Hassinger | |
| 2004/0088206 A1 | 5/2004 | Thompson et al. | |
| 2006/0004618 A1* | 1/2006 | Brixius .............. | G06Q 10/1093 |
| | | | 705/7.18 |
| 2006/0238538 A1* | 10/2006 | Kapler .................. | G06Q 10/10 |
| | | | 345/440 |
| 2007/0150327 A1* | 6/2007 | Dromgold ........... | G06F 16/2477 |
| | | | 705/7.17 |
| 2007/0245300 A1* | 10/2007 | Chan ..................... | G06Q 10/06 |
| | | | 717/104 |
| 2008/0027776 A1* | 1/2008 | Sourov ............ | G06Q 10/06313 |
| | | | 705/7.23 |

| | | | |
|---|---|---|---|
| 2008/0209417 A1 | 8/2008 | Jakobson et al. | |
| 2009/0132318 A1 | 5/2009 | Jin et al. | |
| 2009/0157459 A1 | 6/2009 | Nastacio et al. | |
| 2009/0164996 A1* | 6/2009 | Baeuerle ................... | G06F 9/52 |
| | | | 718/100 |
| 2009/0193353 A1* | 7/2009 | Sharp ..................... | G06Q 10/06 |
| | | | 715/784 |
| 2009/0327403 A1* | 12/2009 | Bhat ....................... | G06F 9/451 |
| | | | 718/102 |
| 2010/0333106 A1 | 12/2010 | King et al. | |
| 2011/0249002 A1* | 10/2011 | Duplessis ............. | G06T 11/206 |
| | | | 345/440 |
| 2012/0130907 A1* | 5/2012 | Thompson ........... | G06Q 10/103 |
| | | | 705/301 |
| 2012/0145152 A1 | 6/2012 | Lain et al. | |
| 2012/0278120 A1* | 11/2012 | Insko ............... | G06Q 10/06311 |
| | | | 705/7.21 |
| 2013/0139106 A1* | 5/2013 | Song ................... | G06F 3/04812 |
| | | | 715/810 |
| 2013/0185693 A1 | 7/2013 | Chaar et al. | |
| 2014/0181791 A1 | 6/2014 | Amano et al. | |
| 2014/0222485 A1 | 8/2014 | Cantor et al. | |
| 2014/0236660 A1 | 8/2014 | Cantor et al. | |
| 2014/0278662 A1* | 9/2014 | Reed ..................... | G06Q 50/08 |
| | | | 705/7.17 |
| 2015/0058053 A1* | 2/2015 | De ................... | G06Q 10/06311 |
| | | | 705/7.13 |
| 2016/0140473 A1* | 5/2016 | Hodes ............... | G06Q 10/1097 |
| | | | 705/7.21 |
| 2016/0335582 A1 | 11/2016 | Suntinger et al. | |
| 2018/0039687 A1 | 2/2018 | Gilboa-Solomon et al. | |
| 2018/0046637 A1* | 2/2018 | Koopman ........... | G06F 16/9558 |
| 2019/0045002 A1* | 2/2019 | Arasachetty ............ | H04L 67/55 |
| 2019/0066028 A1* | 2/2019 | Shor ..................... | G06F 3/0482 |
| 2019/0205484 A1* | 7/2019 | Morkos ........... | G06Q 10/06313 |
| 2020/0244545 A1* | 7/2020 | Chaganti ................ | H04L 41/22 |
| 2020/0257555 A1 | 8/2020 | Tsybulnyk et al. | |
| 2021/0174274 A1* | 6/2021 | Nair .................. | G06F 18/24147 |

OTHER PUBLICATIONS

Osawa, https://ricksoft-inc.com/post/how-to-visualize-dependencies-in-jira/, 2019.

\* cited by examiner

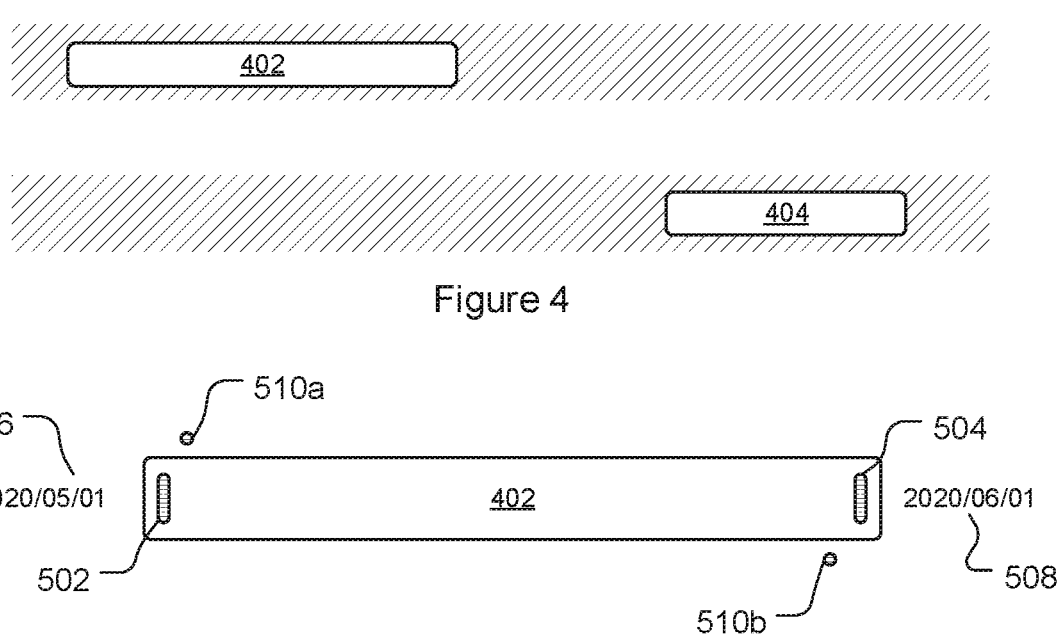
Figure 4
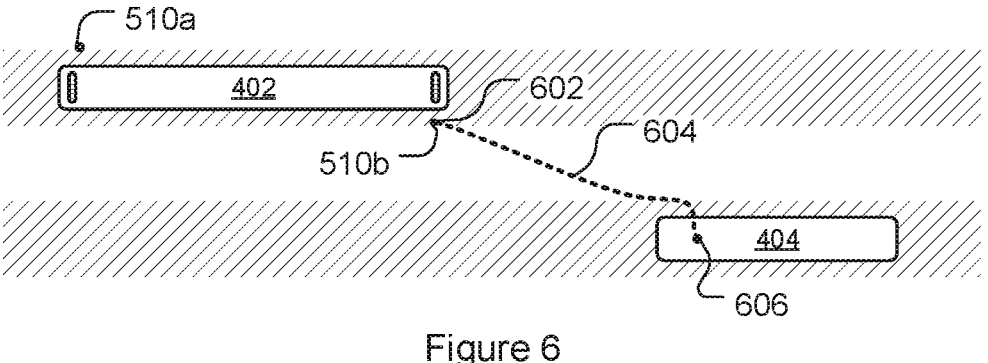
Figure 5
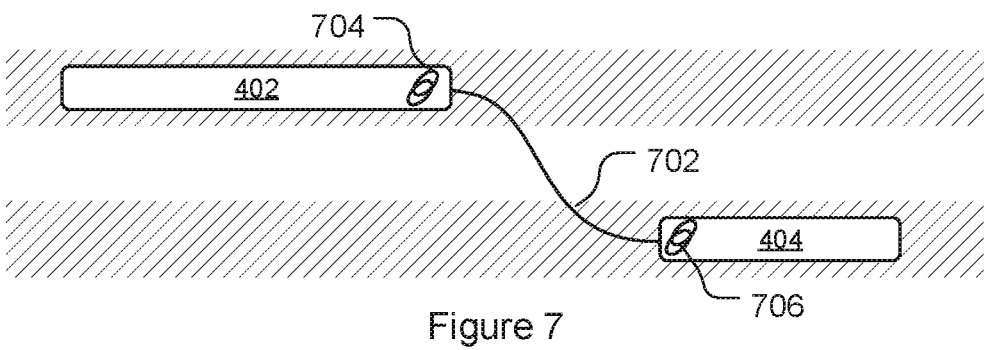
Figure 6
Figure 7

1100

1102 — Display user interface

1104 — Detect display additional control user interaction

1106 — Display additional controls

1108 — Detect create dependency user interaction

1110 — Determine roles of work items in dependency r'ship

1112 — Generate/ communicate new dependency message

1114 — Determine appearance of dependency path

1116 — Display dependency path

1700

1800

MANAGING DEPENDENCIES BETWEEN WORK ITEMS TRACKED BY A HOST SERVICE OF A PROJECT MANAGEMENT SYSTEM

CROSS REFERENCE TO RELATED APPLICATION(S)

This application is a continuation patent application of U.S. patent application Ser. No. 16/908,600, filed Jun. 22, 2020 and titled "Managing Dependencies Between Work Items Tracked By a Host Service of a Project Management System," which is a nonprovisional patent application of and claims the benefit of U.S. Provisional Patent Application No. 62/976,562, filed Feb. 14, 2020 and titled "Computer Implemented Methods And Systems For Project Management," the disclosures of which are hereby incorporated herein by reference in their entireties.

TECHNICAL FIELD

The present disclosure is directed to graphical user interfaces for project management systems and, in particular, to computer implemented methods and systems for displaying and modifying dependencies between work items or tasks managed within a project management application.

BACKGROUND

Project management tools can be leveraged by an organization or team to assist in planning and executing projects. Some projects include or require completion of tasks that are dependent upon completion of other tasks. In many cases, interdependent tasks may be assigned to, rescheduled or reprioritized, or otherwise performed or completed by different individuals or teams.

However, conventional project management tools are incapable to efficiently manage or display interdependencies between related tasks and, as a result, teams must coordinate and negotiate outside the project management tool in order to reschedule or reprioritize tasks.

BRIEF DESCRIPTION OF THE DRAWINGS

FIG. 4 depicts two work item user interface elements.

FIG. 5 depicts a work item user interface element with additional controls.

FIG. 6 depicts a user interaction to create a dependency between two work items.

FIG. 7 depicts two work items in a non-broken dependency relationship.

Figure 1:
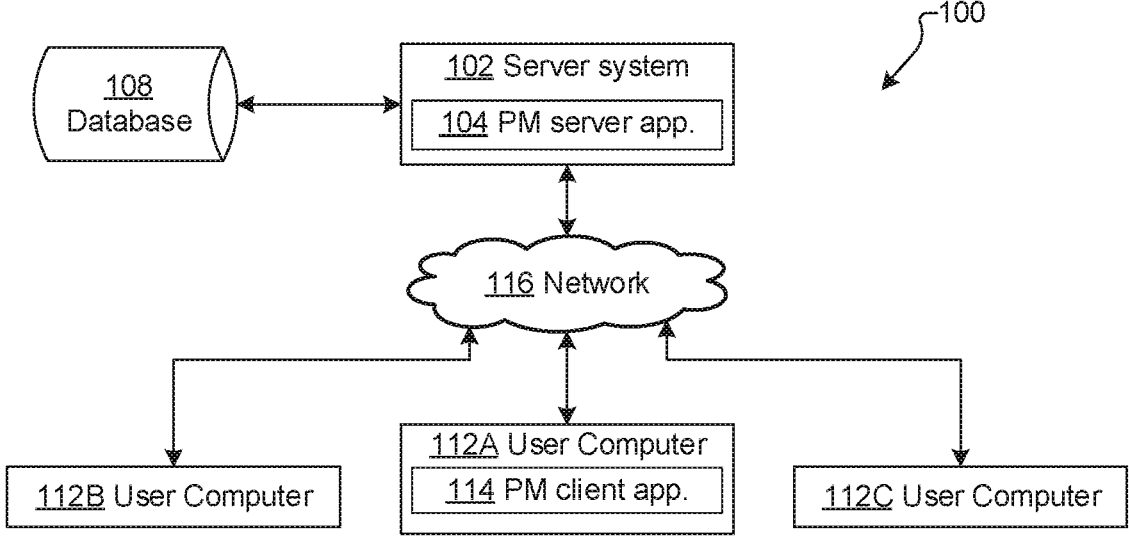
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

The present disclosure generally relates to systems and computer implemented methods for creating, editing, and/or visualizing project schedules. In particular, embodiments described herein provide user interfaces for creating, editing, and/or visualizing work items of a project and dependencies between work items.

As used herein, a work item is any task or set of tasks that forms part of a project. By way of example, in agile methodologies (initially used for software development but increasingly being used for other, non-software development projects) large projects are typically broken up into epics. Epics, in turn, are broken up into stories (the basic work item for a project, also referred to as issues in the Jira project management tool). Depending on the size and scope of a project, multiple epics may be grouped into an initiative (the project having one or more initiatives).

In the present context, therefore, stories, epics (groups of related stories), and initiatives (groups of related epics) are work items of a project.

Alternative project management methodologies may have alternatively named work items. Further, some project management tools provide mechanisms for users to create their own work items—e.g. projects, tasks, sub-tasks or any other named work items. The relevant factor, again, is that a work item is a work item or set of work items that form part of a project.

Often, as is the case in agile methodology, work item types will be hierarchical. For example, a project (the top or level 1 of the hierarchy) may be made up of one or more initiatives (level 2 of the hierarchy), each initiative may be made up of one or more epics (level 3 of the hierarchy), and each epic may be made up of one or more stories (level 4 of the hierarchy). A hierarchy of work item types is not, however, required.

Work items have associated work item information. The specific information associated with a work item, and the manner in which it is stored, will depend on the project management tool in question. By way of example, however, work item information may include information such as: a project identifier identifying the project the work item belongs to; a work item identifier uniquely identifying the work item or, at least uniquely identifying the work item within the project the work item belongs to; a work item type, identifying the type of work item (e.g. an initiative, an epic, a story, a task, a sub-task, or other work item type relevant to the project); a creator identifier identifying the creator of the work item; a creation date indicating the date the work item was created; a work item title; a work item description providing information in respect of the work item (e.g. the work required); a scheduled start indicating the date/time work on the work item is scheduled to start (may be blank); a scheduled end indicating the date/time work on the work item is scheduled to end (may be blank); an actual start indicating the date/time work on the work item is actually started (may be blank); an assignee ID indicating the resource (e.g. an individual or team) to which the work item has been assigned; an actual end time indicating the date/time work on the work item actually ended (may be blank).

Work item information for a given work item may be stored in a data structure such as the table below (though alternative data structures providing for additional/fewer/ alternative items of work item information are possible):

| Example work item data structure |
| --- |
| Project identifier |
| Work item identifier |
| Work item type |
| Creator ID |
| Date created |
| Work item title |
| Work item description |
| Scheduled start |
| Scheduled end |
| Assignee ID |
| Actual start |
| Actual end |

As used herein, a dependency between work items indicates that one work item is dependent on another. Each work item involved in a dependency relationship is referred to as having a role. In the present specification, a given dependency relationship is between an incoming work item and outgoing work item, the relationship being such that the incoming work item must be completed before the outgoing work item can commence (or, phrased in the reverse, the outgoing work item cannot commence until completion of the incoming work item—and is therefore dependent on the incoming work item).

Various terminologies can be used to describe a dependency relationship and the work items associated therewith. By way of example, the following terminologies all describe a dependency relationship where a first work item is the incoming work item and a second work item is the outgoing work item: the first work item blocks the second work item; the first work item is needed by the second work item; the first work item is depended upon by the second work item. The reverse of these relationships can also be described: the second work item is blocked by the first work item; the second work item needs the first work item; the second work item depends on the first work item.

A dependency between two work items may be referred to as having a direction. For example, dependency between work item A and work item B may have the direction A to B (indicating that work item A is the incoming work item and blocks work item B which is the outgoing work item) or the direction B to A (indicating that work item B is the incoming work item and blocks work item A which is the outgoing work item).

A dependency relationship may be between work items of different types. For example, and continuing with the agile methodology work items described above: a first story in a first epic may block a second story from the same epic; a first story in a first epic may block a second story from a second (different) epic—in which case the second epic is blocked by the first story; a first epic may block a second epic (in the same or a different initiative as the first epic); a first epic in a first initiative may block a second epic from a second (different) initiative—in which case the second initiative is blocked by the first initiative; a first initiative may block a second initiative.

A given work item may be involved in multiple dependency relationships. For example, a first dependency relationship may define that work item A depends on (is blocked by) work item B, and a second dependency relationship may define that work item B depends on (is blocked by) work item C. In this case, work item B is the outgoing work item in the first dependency relationship and the incoming work item in the second dependency relationship.

Once created, a dependency may be recorded in various ways. For example, in certain implementations each dependency has associated dependency information that includes an incoming work item identifier (identifying the incoming work item) and an outgoing work item identifier (identifying the outgoing work item). Dependency information can also include, for example, a creator identifier identifying the creator of the dependency, a creation date indicating the date the dependency was created, and/or any other relevant information.

Dependency information for a given dependency may be stored in a data structure such as the table below (though alternative formats providing for additional/fewer/alternative items of dependency information are possible):

| Example dependency data structure |
| --- |
| Incoming work item ID |
| Outgoing work item ID |
| Creator ID |
| Date created |

Dependencies as described herein may be broken or non-broken. A broken dependency is a dependency in which a first work item is blocked by (dependent on) a second work item, but the first work item has a scheduled start that is before the scheduled end of the second work item. Conversely, a non-broken dependency is a dependency in which a first work item is blocked by (dependent on) a second work item and the first work item has a scheduled start that is after the scheduled end of the second work item.

The techniques and features described herein may be employed within any appropriate project management (PM) tool. One example of such a tool is Jira made available by Atlassian. Such a tool allows (inter alia) users to create projects, define work items associated with a project (e.g. stories, epics, initiatives, and/or other work items), assign resources to work items (e.g. individuals, teams, or other resources), and schedule work items over time (e.g. set start and/or end times for work items).

Initially, an example environment in which the features of the present disclosure can be implemented and computer processing system will be described. Following this, various user interface features for displaying, creating, and editing work item dependencies and associated information are described.

As noted, the various features described herein are implemented within the context of a computer implemented project management tool. In certain implementations, the project management tool is implemented in a client-server architecture in which a client application (e.g. computer readable instructions and data) runs on an end-user computer system and communicates with a server application running on a server system, the client and server applications operating together to perform the various features and functions described herein.

FIG. 1 provides an example client server architecture 100, and the embodiments will be described with reference to this architecture.

Client server architecture 100 comprises a server system 102. Server system 102 hosts a project management server application, which will be referred to as the host service 112 which, when executed by the server system 102 configures the server system 102 to provide server-side functionality. The host service 112 comprises one or more application programs, libraries, APIs or other software elements that implement the features and functions that are further described herein.

The server system 102 also stores or has access to data. In this example data is stored on and managed by a database 108. Data could be stored in additional or alternative manners, for example on a local file system of the server system 102. In this example, database 108 is provided by a database server which may run on server system 102, but will more typically operate on a separate physical computer coupled (directly or indirectly via one or more networks) to the server system 102.

Architecture 100 also comprises a client device 112. The client device 112 executes, hosts, or otherwise instantiates a project management client application, referred to as the client application 114. When executed by the client device 112, the client application 114 configures the client device 112 to provide client-side functionality.

The client application 114 may be a general web browser application (such as, for example, Chrome, Safari, Internet Explorer, Opera). In this case the client application 114 accesses the host service 112 via an appropriate uniform resource locator (URL) and communicates with the host service 112 via general world-wide-web protocols (e.g. http, https, ftp). The web browser application is configured to request, render and display electronic documents that conform to a markup language such as HTML, XML or extensions, and may be capable of internally executing browser-executable code. Where the client application 114 is a web browser, the host service 112 will be a web server (such as, for example, Apache, IIS, nginx, GWS).

Alternatively, the client application 114 may be a specific application programmed to communicate with host service 112 using defined application programming interface (API) calls. In this case the host service 112 will be a specific application server configured to interact with the client application 114.

A client device 112 may host more than one client application 114 (for example a general web browser client and a specific application client). Similarly, server system 102 may host more than one SA 114.

The server system 102 may serve multiple user computers 112 (or, more specifically, multiple client applications 114). In FIG. 1 three user computers have been depicted (112A, 112B, and 112C), though more or fewer are possible.

The server system 102 and user computer(s) 112 communicate data between each other either directly or indirectly through one or more communications networks 116.

Further alternative system implementations/architectures are possible. For example, in certain cases a clustered architecture may be used where multiple server computing instances (or nodes) are instantiated to meet system demand. Conversely, the scheduling functionality described herein may be provided in a stand-alone implementation, e.g. a stand-alone software application that is executed by a single computer system to provide the features and functions described herein without need of a server system.

The server system 102 may be any computer processing system which is configured (or configurable) by hardware and/or software to provide the server-side functionality described herein. Similarly, client device 112 may be any computer processing system which is configured (or configurable) by hardware and/or software to provide client-side functionality as described herein. By way of example, suitable client and/or server systems may include: server computer systems, desktop computers, laptop computers, netbook computers, tablet computing devices, mobile/smart phones, personal digital assistants, and other computer devices/systems.

One example of a computer processing system is described below with reference to FIG. 2, described in the next section. The features and techniques described herein are implemented using one or more computer processing systems.

Figure 2:
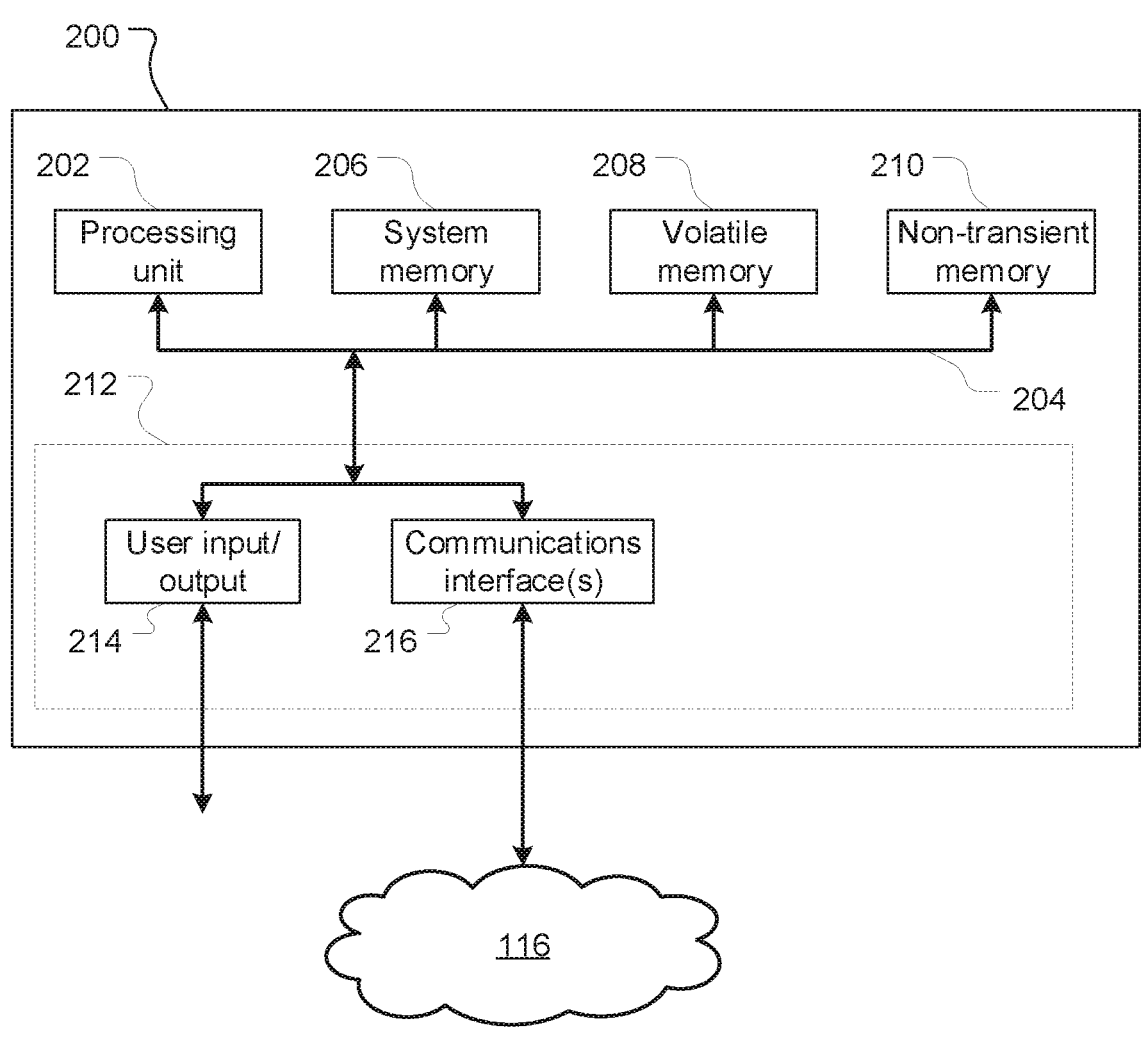
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical work items of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer work items than those depicted.

Computer processing system 200 includes at least one processor 202. The processor 202 may be a single computer processing device (e.g. a central processor, graphics processor, or other computational device), or may include a plurality of computer processing devices. In some instances all processing will be performed by processor 202, however in other instances processing may also be performed by remote processing devices accessible and useable (either in a shared or dedicated manner) by the system 200.

Through a communications bus 204 the processor 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; Bluetooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processor 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 may also connect to one or more communications networks (e.g. the Internet, a local area network, a wide area network, a personal hotspot etc.) to communicate data to and receive data from networked devices, which may themselves be other computer processing systems.

System 200 may be any suitable computer processing system such as, by way of non-limiting example, a server computer system, a desktop computer, a laptop computer, a netbook computer, a tablet computing device, a mobile/smart phone, a personal digital assistant, or other computing device/system.

Typically, system 200 will include at least user input and output devices 214 and a communications interface 216 for communication with a network such as network 116 of environment 100.

System 200 stores or has access to computer applications (also referred to as software or programs)—i.e. computer readable instructions and data which, when executed by the processor 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows®, Apple macOS, Apple iOS, Android, Unix, or Linux.

System 200 also stores or has access to applications which, when executed by the processor 202, configure system 200 to perform various computer-implemented processing operations described herein. For example, and referring to the FIG. 1 above, server system 102 includes a project management server application 104 which configures the server system 102 to perform the described server system operations, and client device 112 includes a project management client application 114 which configures the client device 112 to perform the described client system operations, In some cases part or all of a given computer-implemented method will be performed by system 200 itself, while in other cases processing may be performed by other devices in data communication with system 200.

Project Management User Interface

Figure 3:
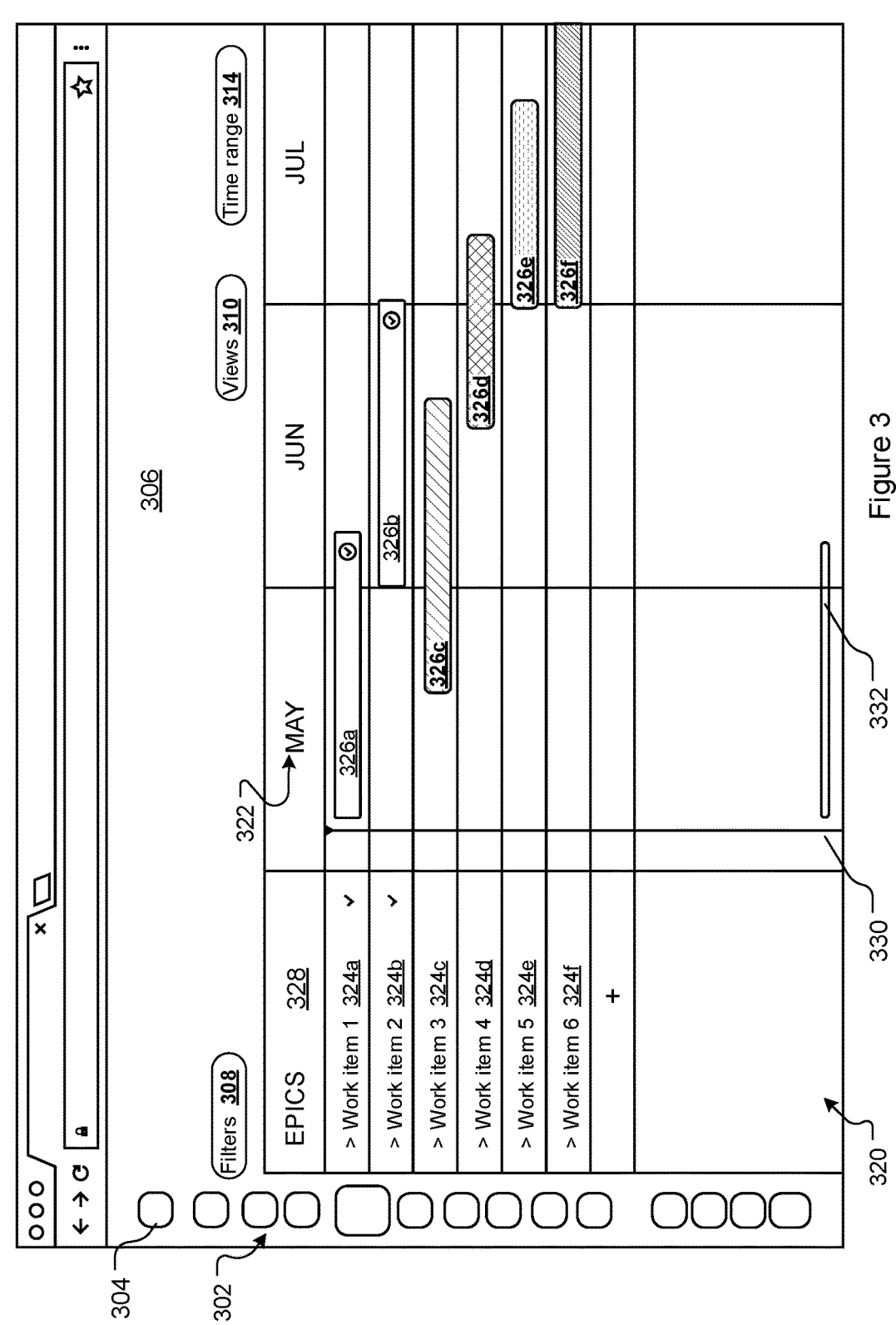
FIG. 3 depicts an example user interface.

FIG. 3 provides an example user interface 300. User interface 300 is displayed on a display/touch screen display of a user computer such as client device 112. The user interface is generated by the client application (CA) 114 (in conjunction with an operating system of the client device 112).

As noted, in the described embodiments the PM tool operates on a client server architecture. Accordingly, data displayed in user interface 300 includes data provided by the server application (SA) 104 and interaction with the user interface causes the client application 114 to communicate data back to the host service 112 (e.g. to be processed and saved in database 108).

User interface 300 includes a control panel 302 which, in turn, includes a number of PM tool controls 304. Various controls 304 can be provided and generally speaking provide a user with access to various functions provided by the PM tool. These include creating/editing and saving projects and work items thereof.

User interface 300 includes scheduling interface 306. In this example, scheduling interface 306 includes a filters control 310, a views control 312, a time range control 314, and a timeline interface 320.

When the client application 114 detects user interaction with the filters control 308 the client application 114 displays further user interface (UI) elements (e.g. via a drop down menu, overlay menu, or other UI tool) that can be used to select various filters that determine the work item user interface elements 326 (discussed below) displayed in the timeline interface 320. For example, the client application 114 may display additional controls which can be used to display/hide display of particular types of work items, display/hide display of work items assigned to/not assigned to a particular team or individual, and/or apply other filters.

When the client application 114 detects user interaction with the time range control 314, the client application 114 displays further user interface elements that can be used to select the time range covered by the timeline interface 320 (e.g. a from date and to date) and/or the time granularity depicted by the timeline interface 322—e.g. days, weeks, months, quarters, years, etc.

Timeline interface 320 in this example is a grid with time on a horizontal axis and work items of a project currently being viewed on a vertical axis. In alternative implementations these axes could be switched.

In the present example, the time range covered by the timeline interface is indicated by column labels 322 at the top of each column. In this case the time granularity is months and the time range is May, June, July and part of August.

The work items displayed on the timeline interface indicated by row labels 324 at the left of each row. In this case six work items are displayed, with labels work item 1 through to work item 6 (324a-324f). In an actual implementation the work item titles may be used in place of generic labels as shown.

Timeline interface 320 further includes work item user interface elements 326. Each work item user interface element corresponds to a work item of the project being displayed. In this case six work item user interface elements are shown (326a-326f) corresponding to work items 1 to 6 (per row labels 324a to 324f).

In this example, each work item user interface element 326 is generally rectangular in shape. The element horizontally aligned in its row (as defined by its corresponding row label 324) and vertically aligned according to the scheduled start and end times of the work item represented by the user interface element.

In timeline interface 320 the timeline runs from left (earlier times) to right (later times) and therefore the leftmost end of the work item user interface element aligns with (or approximately with) the scheduled start time of the corresponding work item, and the rightmost end of the work item user interface element aligns with (or approximately with) the scheduled end time of the corresponding work item. For example, work item user interface element 326B occupies all of the 'Jun' column and a small portion of the 'Jul' column, indicating that the work item represented by work item user interface element 326B has a scheduled start of approximately 1 June and a scheduled end of approximately 1 July. The timeline control 320 may be provided with additional columns or other visual indicators to allow start and end times to be more precisely displayed (e.g. providing vertical lines or the like and/or column headers corresponding to days rather than years). Where a scheduled start or end of a work item is before the start or after the end of the time range displayed by the timeline interface the corresponding work item user interface element continues off page (e.g. as is the case with work item user interface element 3260.

In the present example, work item user interface elements are provided with different visual appearances. For example, work item user interface elements corresponding to finished work items have a first appearance (in this case a solid grey shading—e.g. user interface elements 326a and 326b). In addition, work item user interface elements corresponding to finished work items are provided with a finished graphic (in this case a tick symbol).

By way of further example, work item user interface elements corresponding to non-finished work items may be provided with a visual appearance based on the resource (e.g. individual or team) that the work item has been assigned to. In interface 300: user interface element 326c has a second visual appearance (in this case indicated by vertical lines); user interface element 326d has a third visual appearance (in this case indicated by oblique lines); user interface element 326e has a fourth visual appearance (in this case indicated by hatched lines); and user interface element 326f has the second visual appearance (i.e. the same visual appearance as user interface element 326c). These different visual appearances indicate that work items corresponding to user interface elements 326c and 326f are assigned to the same resource, the work item corresponding to user interface element 326d is assigned to a different resource, and the work item corresponding to user interface element 326e is assigned to a different resource again.

Providing work item user interface elements 326 with different appearances can be achieved in various ways—e.g. different colors, different fill patterns, a combination of these or any other visually distinguishing attributes.

Figure 14:
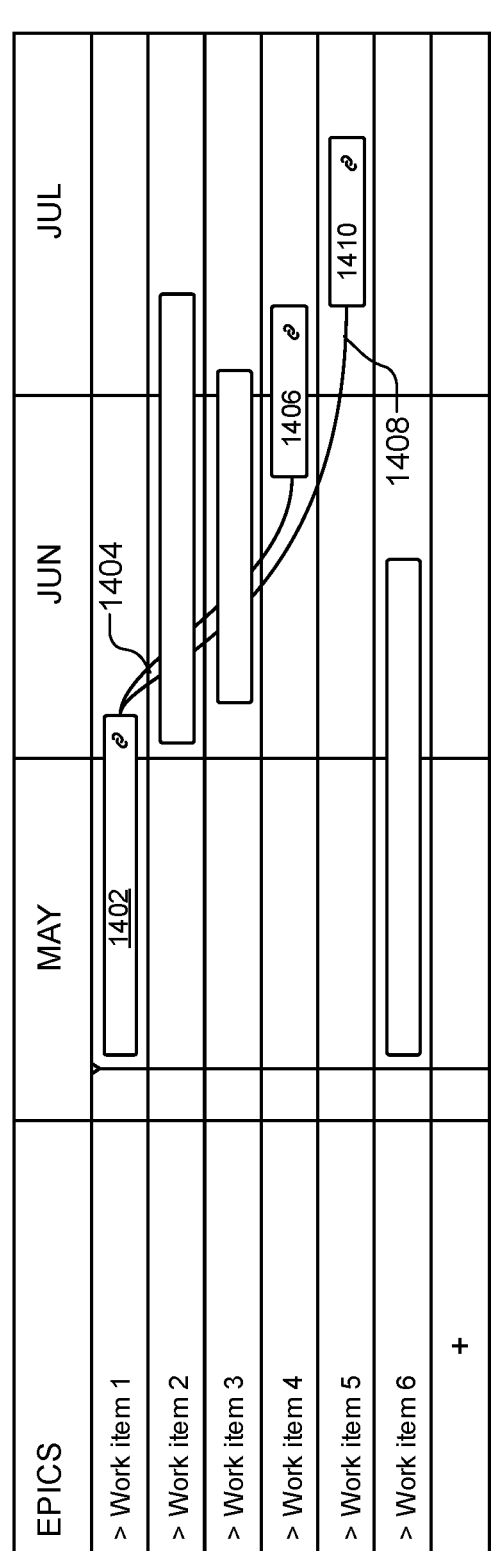
FIG. 14 depicts an example user interface.
Figure 15:
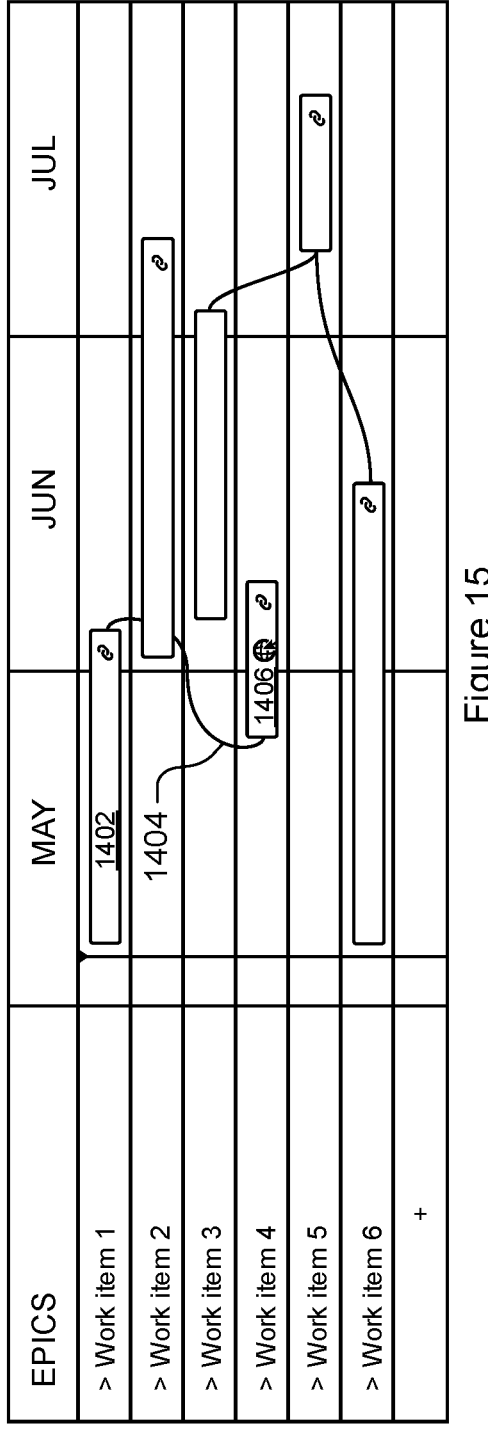
FIG. 15 depicts an example user interface.

In certain embodiments, the client application 114 is configured to permit user interaction with work item user interface elements to change the scheduled start and end of the associated work item. For example, and in the present context where work items are displayed in rows, the client application 114 can be configured to allow a user to drag a work item user interface element left or right along its row. This causes the scheduled start and end of the corresponding work item to change according to where along the timeline the work item user interface element is positioned. In the present example where the timeline runs from left to right, dragging a work item user interface element to the left makes its scheduled start and end earlier, and dragging to the right makes its scheduled start and end later. One example of this is illustrated in FIGS. 14 and 15 as described below.

In this example, the column header of the leftmost row has a work item label 328. The work item type label 326 indicates the highest hierarchy-level work item type being displayed. In the example of FIG. 3, label 326 indicates that 'epics' are the highest level work item type being displayed (i.e. that initiatives are not displayed). In the present example, the highest level work item type being displayed can be selected by the filters control 308—for example a user could (via interaction with the filter control 308) select a different highest level work item type, e.g. so that stories are the highest level work item type shown.

Timeline interface 320 of the present example also includes a current date indicator 330, in this case a vertical line aligning with the current date.

The work item user interface elements 326 (and labels 324) displayed in the timeline interface 320 depend on the currently active filters (set by default or user interaction with the filters control 308) and current time range (set by default or user interaction with the time range control 314). For example, any work item that has a scheduled end before the start of the selected time range or a scheduled start after the end of the selected time range will not have a corresponding work item user interface element 326 displayed in the timeline interface.

Timeline interface 320 of the present example also includes a horizontal scroll bar 332 allowing a user to change the currently displayed time range displayed. Where there are more work items than can fit in the interface a vertical scroll bar can be provided to scroll vertically and change the currently displayed work items.

The present disclosure involves the client application 114 detecting user interaction with various user interface elements. The client application 114 can be configured to provide for and detect various forms of user interaction with any given user interface element. Example user interactions the client application 114 can be configured to provide/detect for a given UI feature or element are described below.

Where a touch sensitive display is the input (and output) device, user interaction with a user interface element can include: detecting a tap gesture at a position on the display corresponding to the user interface element (e.g. a contact with the touch sensitive display that is released within a predetermined, relatively short period of time—e.g. less than one second); detecting a dwell gesture at a position on the display corresponding to the user interface element (e.g. detecting contact on the touch sensitive display that is maintained for at least a predetermined, relatively longer period of time—e.g. 1 second); detecting a swipe gesture commencing at a position on the display corresponding to the user interface element; detecting a swipe gesture terminating at a position on the display corresponding to the user interface element.

Where a mouse or other pointing device is the input device, user interaction with a user interface element can include: detecting a button click, button double click, or specific button click (e.g. right click) while a cursor controlled by the pointing device is positioned over the user interface element; detecting a cursor controlled by the pointing device hovering over the user interface element for at least a predetermined time period (e.g. 0.5 seconds).

Where a keyboard or keypad is the input device, user interaction with a user interface element can include: detecting activation of a particular key; detecting activation of a combination of keys in sequence; detecting activation of a combination of keys concurrently.

Alternative input devices and user interactions are possible. While specific user interactions are described to provide examples it will be appreciated that in other implementations alternative user interactions may be provided for/detected by the client application 114.

For clarity, many features of user interface 300 described above are not shown in the following FIGs. The interface features shown in these FIGs. can, however, be included in a broader user interface such as scheduling interface 300 (or, more specifically, timeline interface 320). Alternatively, the interface features shown in the following FIGs. can be incorporated into an alternative project management tool user interfaces.

Use of the same reference numerals indicate that a feature is the same as or similar to the feature as originally described.

FIG. 4 depicts two work item user interface elements 402 and 404.

FIG. 5 depicts an enlarged work item user interface element 402 which includes additional work item controls. In the present embodiment, the additional work item controls are displayed in response on the client application 114 detecting a display additional control user interaction with a work item user interface element. As described above, various user interactions are possible. By way of specific example, a suitable display additional control interaction may be hovering over, dwelling over, clicking, or contacting the work item user interface element 402.

In FIG. 5, the additional work item controls include: an adjust scheduled start control 502; an adjust scheduled end control 504; a scheduled start date label 506; a scheduled end date label 508; and two create dependency controls 510: a create blocked-by dependency control 510a; and a create blocking dependency control 510b.

The adjust scheduled start and adjust scheduled end controls can be interacted with to adjust (respectively) the scheduled start and end of the work item that the user interface element corresponds to. For example, a user can interact with these controls to drag them away from or toward the center of the user interface element 402. E.g. in the left-to-right timeline context, dragging the adjust scheduled start control to the left (away from the center of the user interface element) will make the scheduled start earlier, while dragging it to the right (toward the center of the user interface element) will make the scheduled start later. Similarly, dragging the adjust scheduled end control to the left (toward from the center of the user interface element) will make the scheduled end earlier, while dragging it to the right (away from the center of the user interface element) will make the scheduled end later. The specific scheduled start and end dates currently selected are, in this example, displayed by the scheduled start date and scheduled end date labels 506 and 508 respectively.

When the client application 114 detects interaction that changes a scheduled start or end date (e.g. by dragging control 502 or 504 and releasing it in a differing position), the client application 114 causes the modified date to be saved. In the present, client-server architecture, the client application 114 generates a work item update capturing the changed data and communicates this to the CS 104 (which can then save the change to the database 108). The work item update can include, for example: the ID of the work item the user interface element 402 corresponds to; a user ID of the user making the change; a time stamp; the new scheduled start or end date.

As will be appreciated, adjusting the scheduled start and not the scheduled end of a work item (or vice versa) effectively changes the duration of the work item—i.e. the time allowed for its completion.

In the example of FIG. 5, user interface element 402 is intended to be displayed on a timeline interface in which earlier times are to the left and later times are to the right (e.g. as in interface 320 above). In this context, the create dependency controls 510 are displayed at opposite ends of the user interface element: specifically, the create blocked-by dependency control 510a is displayed proximate the left end of the user interface element 402, and the create blocking dependency control 510b is displayed proximate the right end of the user interface element 402. More generally, in certain embodiments the create blocked-by dependency control 510a is displayed more proximate to the left end of the user interface element than create blocking dependency control 510b.

As depicted in FIG. 6, the create dependency controls 510 can be interacted with to create a dependency between issues. Such interaction will be referred to as a create dependency user interaction. For example, the client application 114 can be configured to detect a create dependency user interaction comprising a first user input that selects a create dependency control 318 of a first work item user interface element (in this case user interface element 402), a second user input that traces a path to a position at or near a second work item user interface element (in this case, user interface element 404) and selects the second work item user interface element. Selection of the second work item user interface element may be part of the second user input (e.g. occurring automatically on the path reaching the second work item user interface element or a specific portion thereof) or may involve a third user input.

For example, where control is via a pointing device such as a mouse, the first user input may be activating a button of the pointing device button while the cursor is over or proximate the create dependency control 318, the second user input may be moving the mouse pointer to or near to the second work item user interface element 404. Selection of the second work item user interface element 404 may automatically occur on the pointer reaching a particular position with respect to the second work item user interface element 404. Alternatively, selection of the second work item user interface element 404 may require a third user input such as releasing the button while the cursor is over or proximate the second work item user interface element 404.

As a further example, where control is via a touch sensitive display, the first user input may be contacting the display at or near a location the create dependency control 318 is displayed, the second user input may be dragging the contact (without releasing it) to or near to a position the second work item user interface element 404 is displayed. Again, selection of the second work item user interface element 404 may automatically occur on the contact reaching a particular position with respect to the second work item user interface element 404. Alternatively, selection of the second work item user interface element 404 may require a third user input such as releasing the contact while it is at or proximate the second work item user interface element 404.

FIG. 6 depicts this interaction: 602 indicating the first user input (selecting control 510*b*), broken line 604 indicating the second user input—e.g. a path traced by a pointing device or contact with a touch sensitive display, and 606 indicating the third user input (e.g. selecting work item user interface element 404).

In response to detecting a create dependency user interaction, the client application 114 creates a dependency relationship between the work items corresponding to the work item user interface elements involved in the interaction (in this example elements 402 and 404).

In order to determine the roles of the work items involved in the newly created dependency relationship (i.e. which work item is the outgoing work item and which is the incoming work item) the client application 114 determines which create dependency control 510 was interacted with.

If the user interaction was with the create blocking dependency control 510*b* of the first work item user interface element, the client application 114 determines that the first work item blocks the second work item: i.e. the first work item is the incoming work item the second work item is the outgoing work item. This is the situation in the examples of FIGS. 4B and 4C. Conversely, if the user interaction was with the create blocked-by dependency control 510*a* of the first work item user interface element, the client application 114 determines that the first work item is blocked by (or dependent on) the second work item: i.e. the first work item is the outgoing work item and the second work item is the incoming work item.

In addition, the client application 114 updates the user interface to provide one or more visual representations of the dependency. An example of this is depicted in FIG. 7 which includes a dependency path 702 displayed between work item user interface elements 402 and 404. The example of FIG. 7 also includes a pair of linked work item indicators 704 and 706, one displayed on each of work item user interface elements 402 and 404.

In the context of a timeline interface with time on the horizontal axis and earlier times to the left of later times, dependency path 702 indicates that the dependency it represents is not broken: the work item corresponding to user interface element 404 depends on the work item corresponding to user interface element 402, and the work item corresponding to user interface element 402 has a scheduled end before the scheduled start of the work item corresponding to user interface element 404.

The client application 114 can be configured to adjust appearance attributes of the dependency path 702 in various ways depending on the dependency and work items in question.

One appearance attribute of a dependency path that can be adjusted is where the dependency path extends out of the work item user interface elements. For example, in the context of a timeline running left to right, FIG. 7 shows dependency path 702 extending from the right end of work item user interface element 402 and from the left end of work item user interface element 404. In contrast, FIG. 8 (discussed below) shows dependency path 802 extending from the left end of work item user interface element 402 and from the right end of work item user interface element 404.

Generally speaking, the client application 114 is configured to display the dependency path so that for the incoming work item the path extends from a side of the incoming work item's user interface element that corresponds to a later time (e.g. the right side in a timeline running from left to right). For the outgoing work item the client application 114 displays the path to extend from the side of the outgoing work item's user interface element corresponding to an earlier time (e.g. the left side in a timeline running from left to right).

Displaying dependency paths in this way provides an intuitive visual indication as to which work item is the incoming and which is the outgoing.

As can be seen, the additional user interface controls for work item user interface element 402 that are shown in FIG. 6 are not displayed in FIG. 7. In the present embodiment, the client application 114 is configured to hide these controls once a dependency has been created (and/or the user interaction causing the controls to be displayed is no longer detected).

Additional or alternative mechanisms can be used to indicate the direction of a given dependency. For example, dependency paths can be displayed with an arrow: a dependency path pointing from a first work item user interface element to a second work item user interface element indicating the work item corresponding to the second work item user interface element is dependent on/blocked by the work item corresponding to the first work item user interface element.

Figure 8:
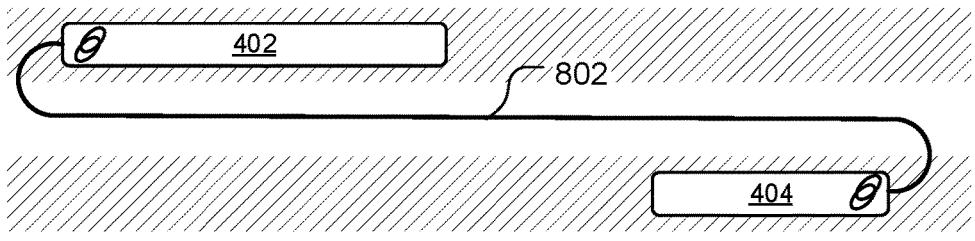
FIG. 8 depicts two work items in a broken dependency relationship.

FIG. 8 provide an example of an alternative user interface generated by the client application 114 in response to detecting user interaction in which the create blocked by control of work item user interface element 402 is selected and dragged to work item user interface element 404. In this case the client application 114 determines that the first work item (corresponding to user interface element 402) is blocked by the second work item (corresponding to user interface element 404) and displays the dependency path 802 so that it extends from the left side of user interface element 402 and the right side of user interface element 404.

In the context of a timeline interface with time on the horizontal axis and earlier times to the left of later times, dependency path 802 also indicates that the dependency it represents is broken: the work item corresponding to user interface element 402 depends on the work item corresponding to user interface element 404, but the work item corresponding to user interface element 402 has a scheduled start before the scheduled end of the work item corresponding to user interface element 404.

In certain embodiments, the client application 114 is configured to visually distinguish dependency paths that represent broken dependencies over dependency paths that represent non-broken dependencies. Various techniques may be used to achieve this visual distinction, for example one or more of: path color (e.g. reserving a particular color—such as red—for paths representing broken dependencies); path line weight; a path line style (e.g. broken lines, dot-dash lines, a line made up of alternative line elements); visual features on a path (e.g. an 'x' or similar displayed on the path).

Figure 9:
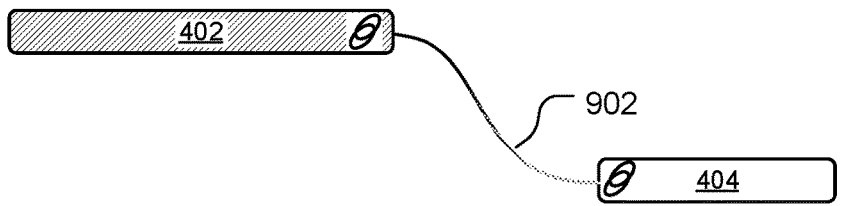
FIG. 9 depicts two work items in a dependency relationship.

As described above, in certain embodiments, the client application 114 is configured to display work item user interface elements in a manner that allows the assignees thereof to be distinguished. In this case the client application 114 may be configured to base the appearance of dependency paths on the appearance of the associated work item user interface elements. FIG. 9 provides an example of this. In FIG. 9, work item UI has a first visual appearance (in this case a black fill) and work item UI has a second visual appearance (in this case a light grey fill). This indicates that the work items corresponding to user interface elements 402 and 404 are assigned to different resources. Based on the appearance of the work item user interface elements 402 and 404, the dependency path 902 is shown with a gradient combining those appearances. Specifically, a first portion of the path that is proximate the first work item user interface element is based on an appearance of the first work item user interface element (in this case black), a second portion of the path that is proximate the second work item user interface element is based on an appearance of the second work item user interface element (in this case light grey), and a third portion of the path that is between the first and second portions transitions between the appearances of the first and second portions (in this case a black to light grey gradient).

In certain embodiments, client application 114 is configured to detect a display dependency information user interaction and, in response, display dependency information.

Figure 10:
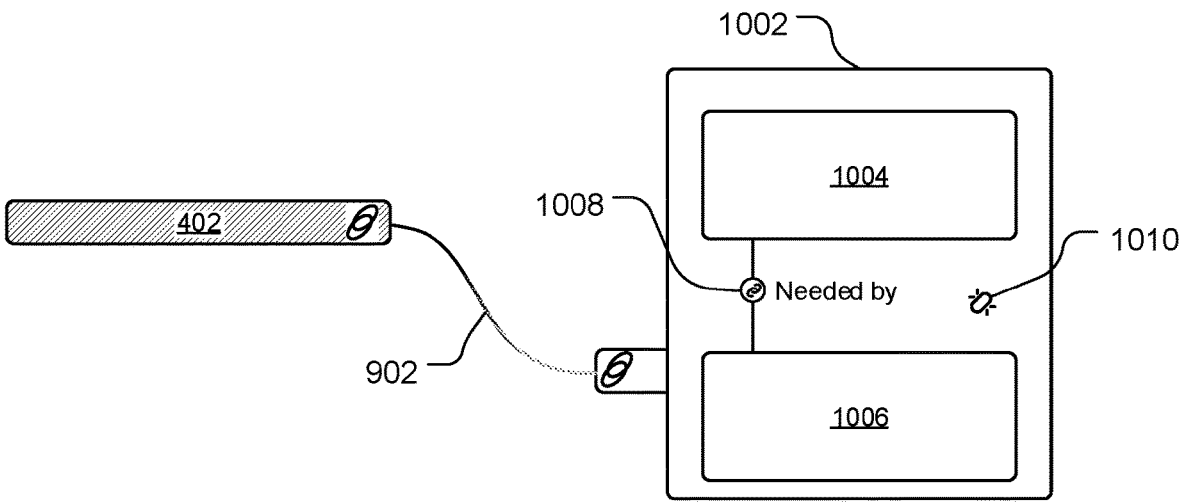
FIG. 10 depicts a dependency information pane.

The CA may be configured to detect a display dependency information user interaction in relation to a dependency path (e.g. hovering, dwelling, contacting, clicking on, or otherwise interacting with the dependency path). In this case, the client application 114 may be configured to display a dependency information pane such as pane 1002 of FIG. 10. Dependency information pane 1002 includes an incoming work item information pane 1004, an outgoing work item information page 1006, dependency indicator 1008, and a delete dependency control 1010.

client application 114 populates the incoming and outgoing work item information panes 1004 and 1006 with information on the incoming and outgoing work items the dependency relates to respectively. In this particular example, the incoming work item is the work item associated with work item user interface element 402 and the outgoing work item is the work item associated with work item user interface element 404. The client application 114 can be configured to retrieve and display various information in respect of the incoming/outgoing work items in the incoming/outgoing work item information panes 1004/1006. This information can include, for example, one or more of: the work item identifier; the work item type; the creator ID; the date created; the work item title; the work item description; the scheduled start; the scheduled end; the assignee identifier (or name associated therewith); the actual start (if started); actual end (if finished).

The client application 114 can, for example, retrieve the work item information to be displayed in the incoming and outgoing work item information panes 1004 and 1006 by requesting the information from the host service 112 using the incoming and outgoing work item identifiers associated with the dependency.

The dependency indicator 1008 provides a visual indication of the dependency relationship between the work items. In this example, dependency indicator 1008 includes a line joining the work information panes 1004 and 1006 (the line including link graphic). In this example the dependency information also includes a description of the dependency—specifically, in this case, the words 'needed by' indicating that the work item described in information pane 1004 is needed by the work item described in information pane 1006.

If client application 114 detects activation of the delete dependency control 1010 it deletes the dependency described by the dependency information pane—for example by generating and communicating a delete dependency message to the CS 104.

The CA may also, or alternatively, be configured to detect a display dependency information user interaction in relation to a work item user interface element (e.g. hovering, dwelling, contacting, clicking on, or otherwise interacting with a work item user interface element or part thereof). In this case, the client application 114 may be configured to display a dependency information pane which provides information on all dependencies the work item corresponding to the work item user interface element that has been interacted with is involved in. One example of such a dependency information pane is described below with respect to FIG. 19.

Figure 11:
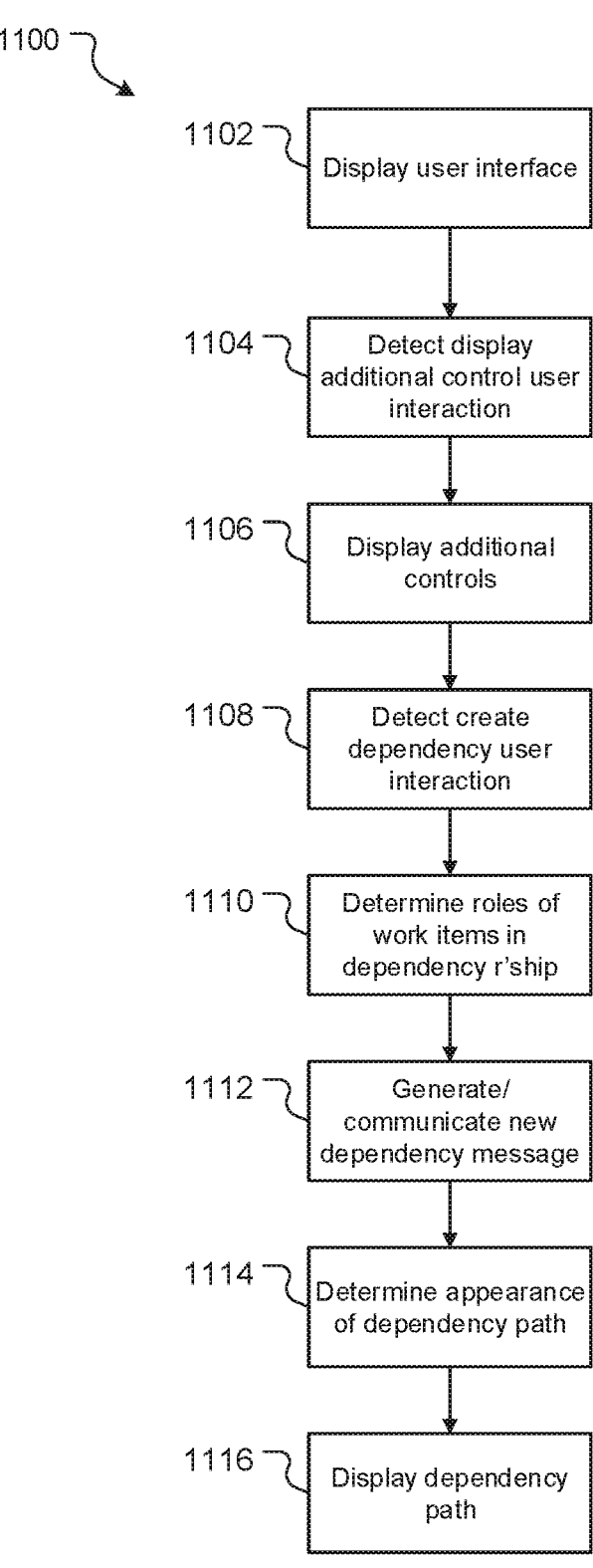
FIG. 11 is a flowchart depicting operations involved in creating a dependency relationship between two work items.

The dependency creation process 1100 will be described with reference to the flowchart of FIG. 11 which illustrates processing performed by a computer processing system. In the present implementation, these processing steps are performed by the client application 114 running on a client device 112.

At 1102, the client application 114 displays a user interface (e.g. 300) which includes at least first and second work item user interface elements (e.g. 402 and 404).

At 1104, the client application 114 detects a display additional controls user interaction with (or in respect of) a first work item user interface element.

At 1106, in response to detecting the display additional control user interaction, the client application 114 displays additional controls associated with the first work item user interface element. The additional controls include a create blocked-by dependency control (e.g. 1110*a*) and a create blocking dependency control (e.g. 1110*b*).

In certain embodiments the client application 114 may display create dependency controls as a 'normal' part of a given work item user interface element. In this case operations 1104 and 1106 are omitted.

At 1108, the client application 114 detects a create dependency user interaction. By way of example, the create dependency user interaction may comprise a first input selecting one of the create blocked-by control or create blocking dependency control and a second input dragging from the selected control to or near to the second work item user interface element. In certain implementations, selection of the second work item user interface element may automatically occur on the drag input reaching a particular position with respect to the second work item user interface element. Alternatively, selection of the second work item user interface element 404 may require a third user input such as releasing a button or contact while over or proximate the second work item user interface element 404.

At 1110, in response to detecting a create dependency user interaction, the client application 114 determines the roles of the work items involved in the dependency relationship. In the present embodiment, and as described above, this involves determining which create dependency control (e.g. 1110) the user interaction detected at 1108 was in respect of.

If the user interaction was with the create blocking dependency control (e.g. 1110*b*) of the first work item user interface element, the client application 114 determines that the first work item is the incoming work item and the second work item is the outgoing work item. Conversely, if the user interaction was with the create blocked-by dependency control (e.g. 1110*a*) of the first work item user interface element, the client application 114 determines that the first work item is the outgoing work item and the second work item is the incoming work item.

At 1112, the client application 114 causes the newly created dependency to be saved. This could, however, be performed at an alternative time. In the present, client-server architecture, to save the dependency the client application 114 generates a new dependency message (or messages) capturing information in respect of the new dependency and communicates the message(s) to the CS 104 (which can then save the new dependency to the database 108). Continuing with the example dependency data structure described above, the new dependency message(s) can include an incoming work item identifier (identifying the incoming work item), an outgoing work item identifier (identifying the outgoing work item), a creator identifier identifying the creator of the dependency, and a creation date indicating the date the dependency was created.

At 1114, the CA determine an appearance of a dependency path that will be displayed. As described above (and per the further examples below), the CA can be configured to determine appearance attributes of the dependency path.

As discussed above, two appearance attributes of the dependency path are where the path extends out of the two work item user interface elements. In the present implementation, the client application 114 is configured to display the dependency path so that: for the incoming work item the path extends from a side of the user interface element corresponding to a later time (e.g. the right side in a timeline running from left to right); for the outgoing work item the path extends from the opposite side of the user interface element—i.e. the side corresponding to an earlier time (e.g. the left side in a timeline running from left to right).

As also discussed above, another factor that may influence the appearance of a dependency path is if the dependency is broken. In implementations that do this, the client application 114 determines whether the dependency is broken and, if so, determines that the dependency path should be shown as a broken dependency. In order to determine if a dependency is broken the client application 114 compares the scheduled end of the incoming work item to the scheduled start of the outgoing work item. If the client application 114 does not already have this data it can request it from the host service 112 using the work item identifiers of the incoming/outgoing work items. If the scheduled end of the incoming work item is the same or earlier than the scheduled start of the outgoing work item the client application 114 determines the dependency is not broken. Conversely, if the scheduled end of the incoming work item is later than the scheduled start of the outgoing work item the client application 114 determines the dependency is broken.

If the scheduled end of the incoming work item is the same as the scheduled start of the outgoing work item the client application 114 will typically be configured to determine the dependency as broken, but could alternatively be configured to determine it as not broken (and, potentially, display or otherwise output a warning that one task is scheduled to start on the same day the task it is dependent on is scheduled to end).

As also discussed above, the client application 114 may be configured to determine the appearance of the dependency path based the appearance of the associated work item user interface elements. In this case the client application 114 determines the appearances of work item user interface elements involved in the relationship (which, as noted, may be based on the resources those work items are assigned to) and generate a dependency path with a gradient appearance. This may be, for example, a path that has: a first portion proximate the outgoing work item's user interface element and that has first visual properties based on visual properties of the outgoing work item's user interface element; a second portion proximate the incoming work item's user interface element and that has second visual properties based on visual properties of the incoming work item's user interface element; and a third portion between the first and second portion that transitions from the first visual properties to the second visual properties (e.g. via a gradient or other mechanism).

Where the client application 114 displays broken dependencies in a particular manner and the broken dependency path appearance cannot co-exist with a path appearance based on the appearances of the work items, the broken dependency path appearance takes precedence. For example, if the CA is configured to display a red path for broken dependencies and a path that is made up of colors of the associated work items, the client application 114 will be configured to prevent work items from having the red color used for broken dependencies and, in the event a broke dependency is detected, show that dependency as red (and not a combination of the colors of the associated work items).

In some implementations, the client application 114 may be configured to display all dependency paths in the same manner (for example a path between the two work item user interface elements of a set color/weight etc.). In this case operation 1114 can be omitted.

At 1116, the client application 114 displays the dependency path with the appearance determined at 1114.

Figure 12:
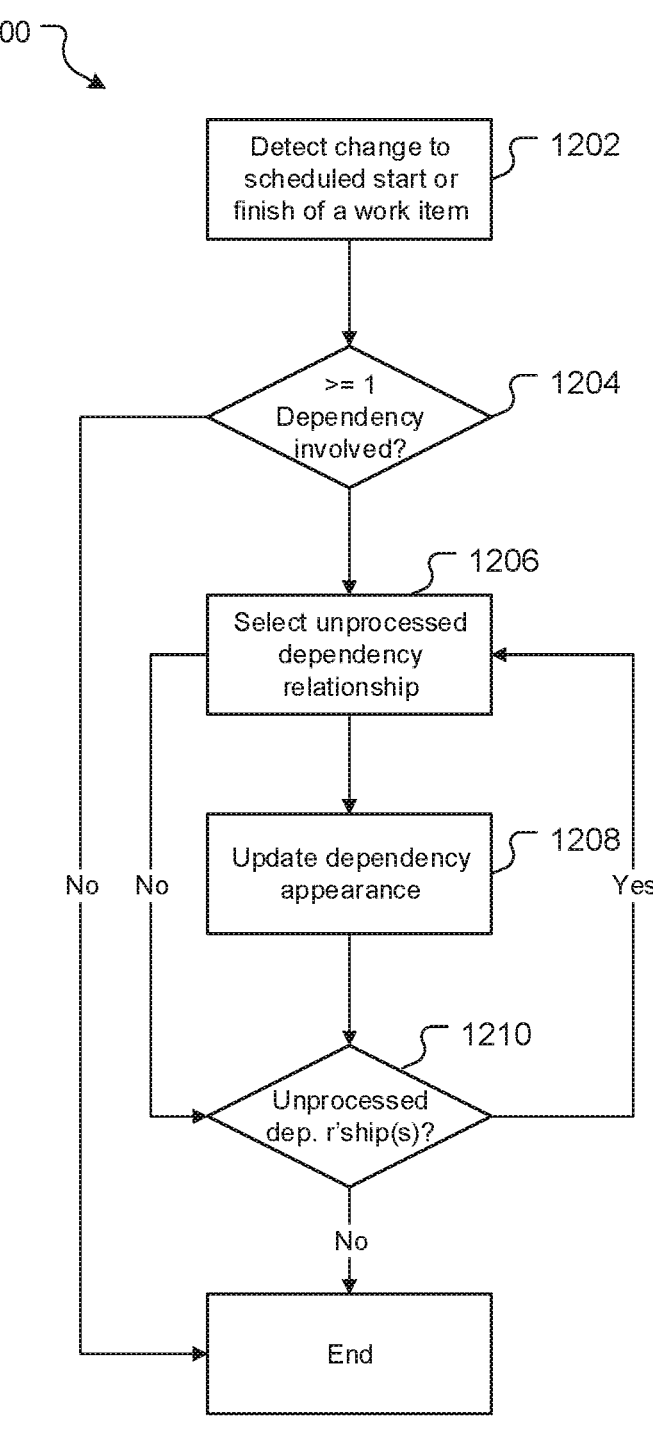
FIG. 12 is a flowchart depicting operations involved in updating a dependency relationship.

The dependency update process 1100 will be described with reference to the flowchart of FIG. 12, which illustrates processing performed by a computer processing system. In the present implementation, these processing steps are performed by the client application 114 running on a client device 112.

At 1202, the client application 114 detects user interaction causing the scheduled start and/or end of a particular work item to change. Various examples of interactions causing such a change are described above. For example, a user may: drag a work item user interface element along its row causing the corresponding work item's scheduled start and end to change; interact with an adjust scheduled start control (such as 502) causing the scheduled start of the corresponding work item to change; interact with an adjust scheduled end control (such as 504) causing the scheduled end of the corresponding work item to change. Additional interactions to change the scheduled start and/or end or a work item are possible.

At 1204, the client application 114 determines whether the particular work item is involved in any dependency relationships. If not, the current process end. If so, processing proceeds to 1206.

At 1206, the client application 114 selects a dependency relationship that the particular work item is involved in and that has not yet been processed. Dependency relationships the particular work item is involved in may be selected for processing in any order.

At 1208, the client application 114 updates the appearance of the selected dependency relationship in the user interface. In particular, if the client application 114 determines the change to the scheduled start/finish of the particular work item results in a broken dependency it updates the displayed dependency path to reflect this (as described above). In this case the client application 114 may be configured to also display an alert (e.g. a pop-up text box or other alert) indicating to the user that the changes have resulted in a broken dependency. if the client application 114 determines the change to the scheduled start/finish of the particular work item results in a not broken dependency it updates the displayed dependency path to reflect this (as described above). If the dependency was initially broken and remains broken, or was initially not broken and remains not broken, no update to the appearance of the dependency path (aside from reflecting new start and end points) may be necessary.

If the particular work item is the incoming work item in the selected dependency relationship, determining whether the change to the scheduled start/finish results in a broken dependency relationship involves determining whether the scheduled end of the particular work item (as changed if it has been changed) is before the scheduled start of the outgoing work item of the selected dependency relationship. If so, the client application 114 determines the selected dependency relationship to be broken. If not, the client application 114 determines the selected dependency relationship to be not broken.

If the particular work item is the outgoing work item in the selected dependency relationship, determining whether the selected dependency relationship is broken involves determining whether the scheduled start of the particular work item (as changed if it has been changed) is earlier than the scheduled end of the incoming work item of the selected dependency relationship. If so, the client application 114 determines the selected dependency relationship to be broken. If not, the client application 114 determines the selected dependency relationship to be not broken.

At 1210, the client application 114 determines whether there are any dependency relationships the particular work item is involved in that have not been processed. If so, processing returns to 1206. If not, process 1200 ends.

Figure 13:
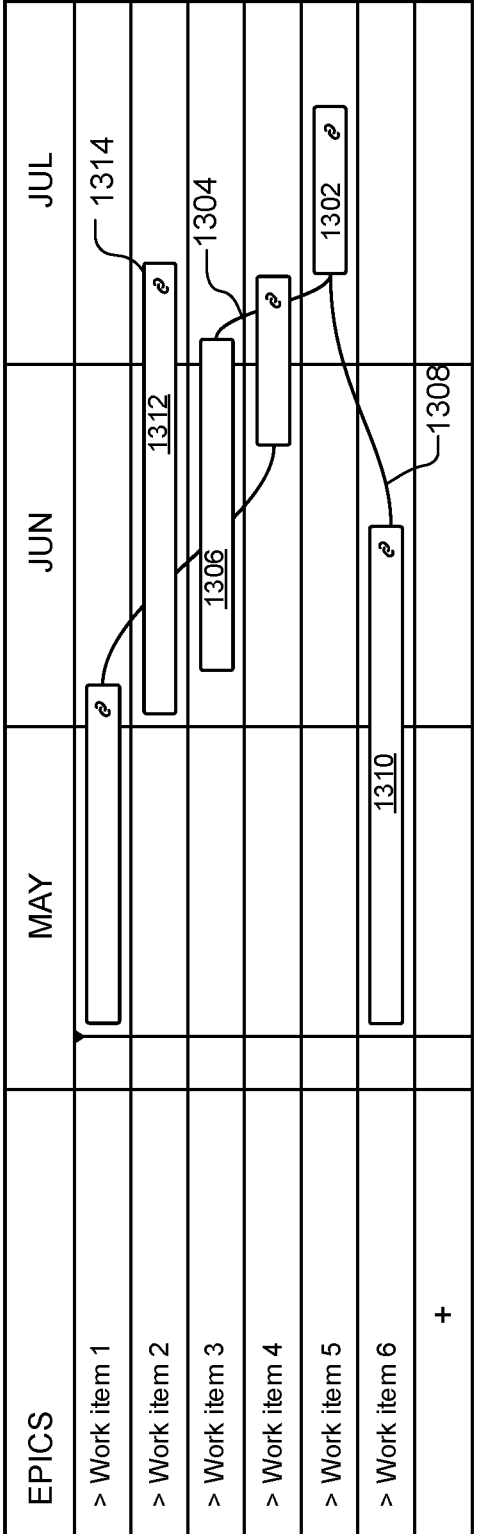
FIG. 13 depicts an example user interface.

FIG. 13 depicts a timeline interface in which the work item corresponding to work item user interface element 1302 is the outgoing work item in two dependency relationships: one, 1304, with the work item corresponding to work item user interface element 1306; one, 1308, with the work item corresponding to work item user interface element 1310. This indicates that the work items corresponding to user interface elements 1306 and 1310 must both be completed before the work item corresponding to user interface element 1302 can commence.

Furthermore, work item user interface element 1312 includes a linked work item indicator 1314 indicating that the corresponding work item is involved in a dependency relationship. No dependency path extending from work item user interface element 1312 is, however, displayed. This may indicate that the other work item in the dependency relationship is in another project. It could alternatively be the result of the other work item not being displayed, for example due to an active filter causing it not to be shown. In this case a user can interact with the linked work item indicator 1314 to cause the client application 114 to display further information in respect of the dependency (for example in a dependency information pane such as 1002 described above).

FIG. 14 depicts a timeline interface in which the work item corresponding to work item user interface element 1402 is the incoming work item in two dependency relationships: one, 1404, with the work item corresponding to work item user interface element 1406; one, 1408, with the work item corresponding to work item user interface element 1410. This indicates that the neither of the work items corresponding to user interface elements 1406 and 1410 can be commenced until the work item corresponding to user interface element 1402 is complete.

FIG. 15 depicts the timeline interface of FIG. 14 following user interaction with work item user interface element 1406 to change its scheduled start/end (e.g. by dragging user interface element 1406 to the left). In doing so, the user has broken dependency 1404 (due to dragging the user interface element 1406 to a position where its corresponding work item has a scheduled start that is earlier than the scheduled end of the work item corresponding to user interface element 1402. In response to this interaction, the client application 114 has adjusted the dependency path 1404 between the two work item user interface elements 1402 and 1404 in accordance with the new scheduled start/end, and has also modified the appearance of the dependency path 1404 to show that represents a broken dependency (e.g. by changing the color of the dependency path from grey to red or otherwise modifying its appearance to indicate a broken dependency).

Figure 16:
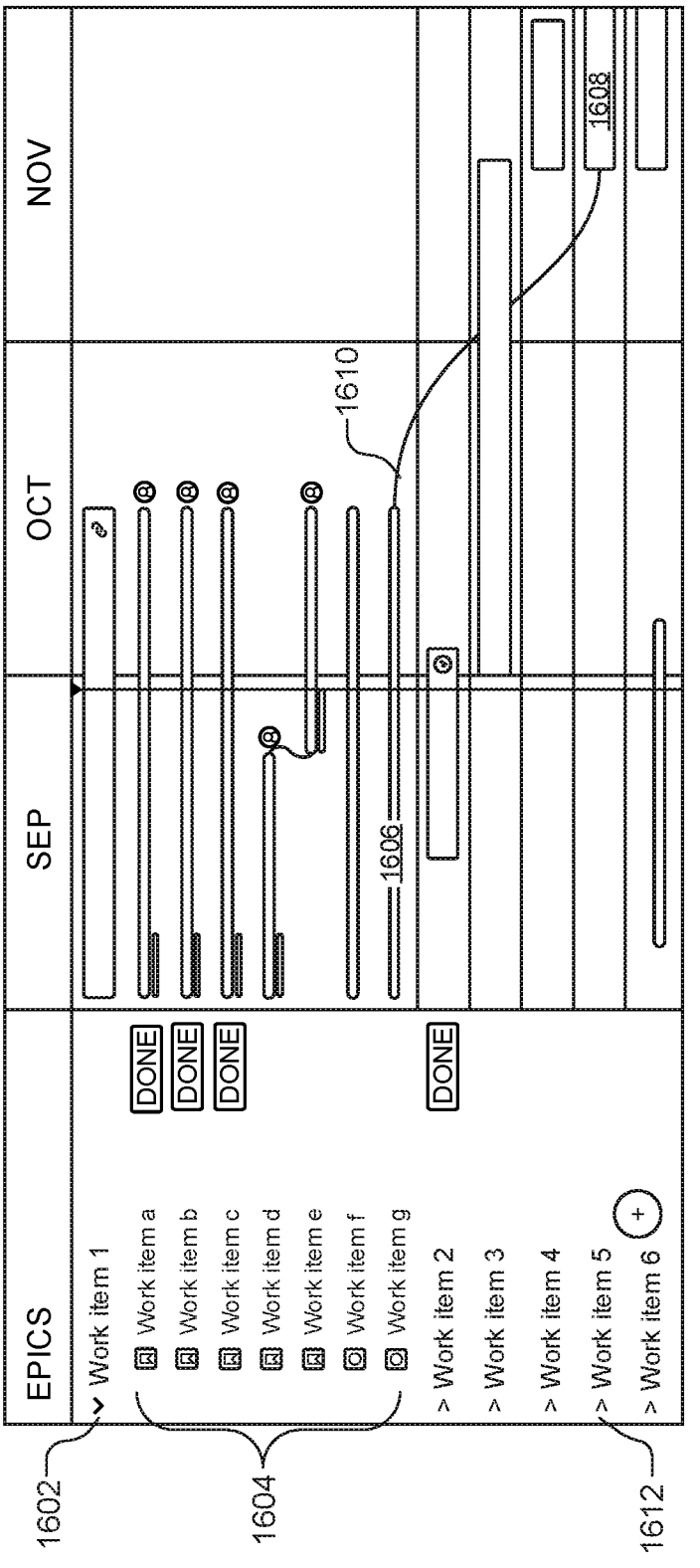
FIG. 16 depicts an example user interface.

FIG. 16 depicts an interface in which shows two types of work items: in this case epics and stories. To do so, the client application 114 is configured to provide the row labels (which in this case represent epics) as user interface elements that, when interacted with (e.g. by clicking or contacting) expand to show associated sub-level work items (in this case stories).

In FIG. 16, row label 1602 (related to the epic with title "NextGen Front-end") has been activated to expand and show its component stories 1604 (e.g. Contextual Menu Sections, GSA Requirements, etc.). Each component story is provided with its own row in the timeline interface. Furthermore, the stories (sub-work items) are visually distinguished from their parent epic (the parent work item)—in this case via row label indentation.

FIG. 16 also provides an example of a sub-work item of a parent work item being involved in a dependency relationship with a different parent work item. E.g. story 1606 (with title 'loading Bug in Safari') is a sub-work item of epic 1602, but is in a dependency relationship with epic 1608 (with label 'Third Party Service). This may indicate that story 1606 is in a direct relationship with epic 1608 or that story 1606 is in a relationship with one or more stories of epic 1608. This would become apparent if a user caused additional dependency information to be shown (e.g. in a dependency information pane—e.g. by activating dependency path 1610), or expanded epic 1608 to show its stories (e.g. by selection of the epic's title/carat 1612 in the row label).

Figure 17:
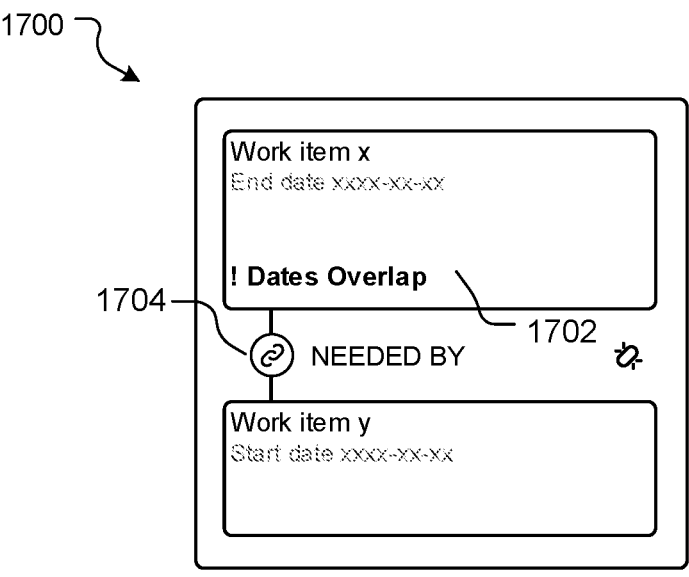
FIG. 17 depicts an example dependency information pane.

FIG. 17 provides a further example of a dependency information pane 1700 (similar to pane 1002 described above). Dependency information pane 1700 relates to a broken dependency and includes an indicator 1702 that the dependency is broken (in this case a warning icon and 'Dates overlap' text). The dependency indicator 1704 may also be provided with an appearance indicating it is broken, for example by being displayed in a particular color (e.g. red) that is different to the color non-broken dependencies are displayed in.

Figure 18:
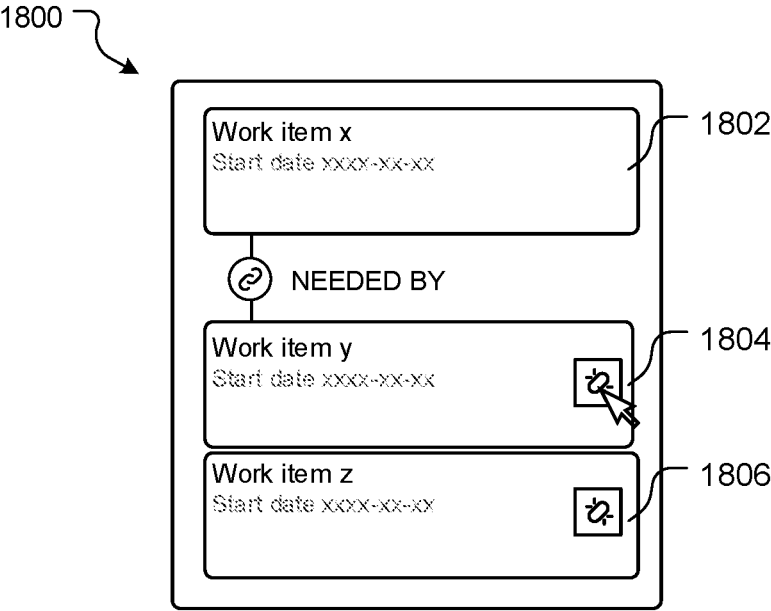
FIG. 18 depicts an example dependency information pane.

FIG. 18 provides another example of a dependency information pane 1800. Dependency information pane 1800 includes a single incoming work item information pane 1802 and two outgoing work item information panes 1804 and 1806. This indicates that the work item associated with incoming work item information pane 1802 is the incoming work item for two separate dependency relationship: one with the work item associated with outgoing work item information pane 1804 and one with the work item associated with outgoing work item information pane 1806. Dependency information pane 1800 is displayed as the result of user interaction with a work item user interface element (rather than a dependency path)—specifically the work item user interface element corresponding to the 'third party service' work item (information on which is displayed in pane 1802).

Figure 19:
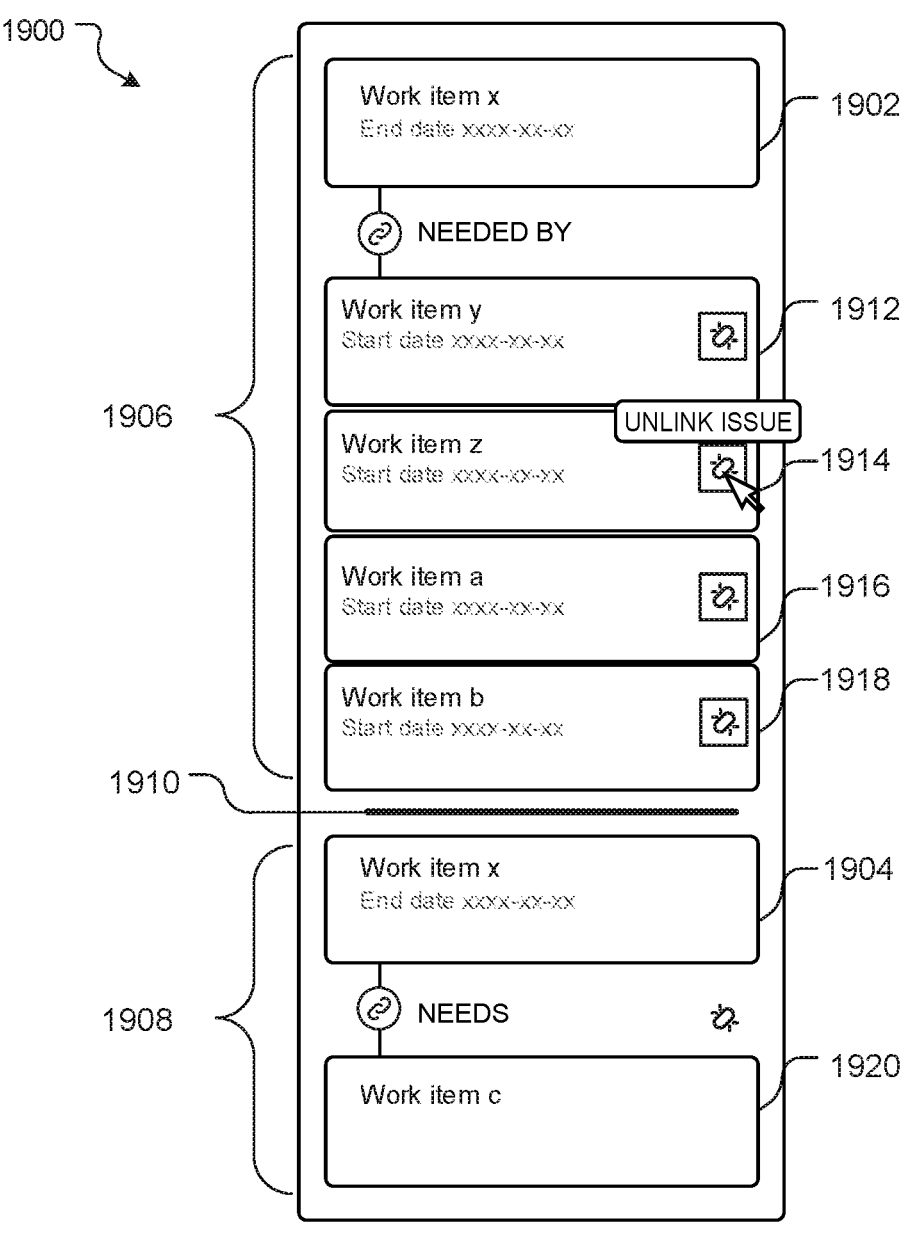
FIG. 19 depicts an example dependency information pane.

FIG. 19 provides a further example of a dependency information pane 1900. Dependency information pane 1900 shows both incoming and outgoing dependencies of a particular work item (the work item associated with outgoing work item information pane 1902 and incoming work item information pane 1904, both of which are associated with the same work item). In this example, dependency information pane 1900 includes two sections 1906 and 1908, divided by a visual separator 1910 (in this case a horizontal line).

Section 1906 shows dependency relationships in which the particular work item is the outgoing work item. In this example, the particular work item is the outgoing work item in four dependency relationships—one with each of the work items associated with incoming work item information panes 1912, 1914, 1916, and 1918.

Section 1908 shows dependency relationships in which the particular work item is the incoming work item. In this example, the particular work item is the incoming work item in a single dependency relationship with the work item associated with outgoing work item information pane 1920.

Dependency information pane 1900 is displayed as the result of user interaction with a work item user interface element (rather than a dependency path)—specifically the work item user interface element corresponding to the 'next-gen font end' work item (information on which is displayed in panes 1902 and 1904).

Many examples and features described above are provided in the context of a timeline interface such as 320 in which time is on a horizontal axis running from left (earlier times) to right (later times). For alternatively oriented timelines, however, alternative positions/directions may be required or be more intuitive to users. Generally speaking, where described in the context of a timeline running from left (earlier times) to right (later times), reference herein to the left direction should be considered reference to the direction of earlier time and reference to the right direction should be considered reference to the direction of later time.

For example, if a timeline interface displayed work items along a horizontal axis (i.e. in columns rather than rows) and time along the vertical axis (for example earlier times above later times so time is seen as running 'down' the interface) features described as being at or near the left end of a work item user interface element could instead be displayed at or near an upper end of the work item user interface element, and features described as being at or near the right end of a work item user interface element could instead be displayed at or near a lower end of the work item user interface element.

Alternatively, if a timeline interface displayed work items along a horizontal axis and time along the vertical axis but with later times above earlier times (i.e. time running 'up' the interface) features described as being at or near the left end of a work item user interface element could instead be displayed at or near a lower end of the work item user interface element, and features described as being at or near the right end of a work item user interface element could instead be displayed at or near an upper end of the work item user interface element.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, work items, integers, steps, or elements.

The present disclosure uses terms "first," "second," etc. to describe various elements. Absent other context/requirements, however, these terms are used to distinguish different elements or features from one another and not in an ordinal sense. For example, absent other context/requirements use of first and second in respect of a first user interaction and a second user interaction does alone indicate any order or precedence: absent other context/requirements, the first user interaction could occur before or after the second user input. Furthermore, reference to a 'first' element or feature does not necessarily imply there must be a second element or feature (e.g. use of the word 'first' in 'a first user input' does not alone imply that there must be a second user input).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A method for modifying a graphical user interface of a client device communicably coupled to a project management host service, the method comprising:

displaying, at a user interface of the client device defined at least in part by a client application communicably coupled to the project management host service, a scheduling interface comprising:

a first user interface element corresponding to a first issue, having a first start time, and having a first end time; and a second user interface element corresponding to a second issue, having a second start time, and having a second end time;

defining, using the graphical user interface, a dependency relationship between the first issue and the second issue;

detecting a user interaction causing a change to the first issue or the second issue;

in response to detecting the user interaction, determining an update to the dependency relationship based on whether the dependency relationship is broken by the user interaction, including:

in response to a determination that the update to the
dependency relationship indicates that the depen-
dency relationship is broken:
causing display of an overlay pane comprising:
a description of a cause of the dependency relationship
being broken; and
a delete dependency control configured to cause dele-
tion of the dependency relationship in response to a
user selection input; and
updating a visual appearance of a dependency path
for the dependency relationship in the graphical
user interface; and
in response to a determination that the update to the
dependency relationship indicates that the depen-
dency relationship is not broken, saving to the proj-
ect management host service.

2. The method of claim 1, wherein the visual appearance
is a first visual appearance, the method further comprising:
in response to defining the dependency relationship
between the first issue and the second issue, displaying,
in the scheduling interface, the dependency path having
the first visual appearance; and
in response to the determination that the update to the
dependency relationship indicates that the dependency
relationship is broken, updating the first visual appear-
ance of the dependency path to be a second visual
appearance.

3. The method of claim 2, wherein:
the first visual appearance comprises at least one first
color; and
the second visual appearance comprises a second color
that is associated with broken dependencies.

4. The method of claim 2, wherein:
the first visual appearance comprises a first line weight;
and
the second visual appearance comprises a second line
weight different from the first line weight.

5. The method of claim 2, wherein the second visual
appearance comprises a visual feature on the dependency
path.

6. The method of claim 2, wherein the first visual appear-
ance comprises a gradient appearance that comprises:
a first portion of the dependency path extending from the
first user interface element, the first portion having a
first visual property based on the first user interface
element;
a second portion of the dependency path extending from
the second user interface element, the second portion
having a second visual property based on the second
user interface element; and
a third portion between the first portion and the second
portion that transitions from the first visual property to
the second visual property.

7. The method of claim 1, wherein determining whether
the dependency relationship is broken comprises:
determining whether the second start time of the second
issue is earlier than the first end time of the first issue.

8. The method of claim 7, wherein the determination that
the update to the dependency relationship indicates that the
dependency relationship is broken is based on the second
start time of the second issue being earlier than the first end
time of the first issue.

9. The method of claim 7, wherein the determination that
the update to the dependency relationship indicates that the
dependency relationship is broken is based on the second
start time of the second issue being equal to or earlier than
the first end time of the first issue.

10. A client device communicably coupled to a host
service of a project management system, the client device
comprising:
a processor;
a communication interface;
an input device;
a display device; and
a memory storing instructions, which when executed by
the processor, cause the processor to instantiate an
instance of a project management client application
configured to:
communicably couple, to the host service, via the
communication interface;
display, on the display device, a scheduling interface
comprising:
a first user interface element corresponding to a first
issue, having a first start time, and having a first
end time; and
a second user interface element corresponding to a
second issue, having a second start time, and
having a second end time;
in response to detecting a create dependency user
interaction at the communication interface, define a
dependency relationship between the first issue and
the second issue;
in response to detecting a user interaction causing a
change to the first issue or the second issue, deter-
mine an update to the dependency relationship based
on whether the dependency relationship is broken by
the user interaction, including:
in response to a determination that the update to the
dependency relationship indicates that the depen-
dency relationship is broken:
cause display of an overlay pane comprising:
a description of a cause of the dependency
relationship being broken; and
a dependency control configured to cause modi-
fication of the dependency relationship in
response to a user selection input; and
update, on the display device, a first visual appear-
ance of a dependency path for the dependency
relationship to be a second visual appearance;
and
in response to a determination that the update to the
dependency relationship indicates that the depen-
dency relationship is not broken, save to the host
service via the communication interface.

11. The client device of claim 10, wherein the instance of
the project management client application is configured to:
in response to defining the dependency relationship
between the first issue and the second issue, display, in
the scheduling interface, the dependency path having
the first visual appearance; and
in response to the determination that the dependency
relationship is broken, update the first visual appear-
ance of the dependency path to be the second visual
appearance.

12. The client device of claim 10, wherein:
the first visual appearance comprises at least one first
color or a first line weight; and
the second visual appearance, which is associated with
broken dependencies, comprises a second color, a sec-
ond line weight, or a visual feature on the dependency
path.

13. The client device of claim 10, wherein the determi-
nation that the update to the dependency relationship indi-
cates that the dependency relationship is broken is based on the second start time of the second issue being earlier than the first end time of the first issue.

14. A method for modifying a graphical user interface of a client device communicably coupled to a project management host service, the method comprising:

displaying, at a user interface of the client device defined at least in part by a client application communicably coupled to the project management host service, a scheduling interface comprising:

a first issue user interface element corresponding to a first issue and having a first dependency control disposed at or near a right end thereof; and a second issue user interface element corresponding to a second issue and having a second dependency control disposed at or near a left end thereof;

receiving, by the graphical user interface, a first user input selecting the first dependency control of the first issue user interface element;

receiving, by the graphical user interface after the first user input, a second user input tracing a path from the first issue user interface element or the first dependency control to a position at or near the second issue user interface element or the second dependency control of the second issue user interface element;

in response to a termination of the second user input, sending a signal from the client device to the project management host service to cause the project management host service to create a dependency relationship between the first issue and the second issue; and in response to a user input provided with respect to at least one of the first issue user interface element or the second issue user interface element, in response to a determination that the update to the dependency relationship indicates that the dependency relationship is broken:

causing display of an overlay pane comprising:

a description of a cause of the dependency relationship being broken; and a dependency control configured to cause modification of the dependency relationship in response to a user selection input; and updating a visual appearance of a dependency path for the dependency relationship in the graphical user interface; and in response to a determination that the update to the dependency relationship indicates that the dependency relationship is not broken, saving to the project management host service.

15. The method of claim 14, wherein the visual appearance is a first visual appearance, the method further comprising:

in response to creating the dependency relationship between the first issue and the second issue, displaying, in the scheduling interface, the dependency path having the first visual appearance; and in response to determining that the dependency relationship is broken, updating the first visual appearance of the dependency path to be a second visual appearance.

16. The method of claim 15, wherein:

the first visual appearance comprises at least one first color or a first line weight; and the second visual appearance comprises a second color different from the at least one first color, a second line weight different from the first line weight, or a visual feature on the dependency path that is associated with broken dependencies.

17. The method of claim 14, wherein the determination that the update to the dependency relationship indicates that the dependency relationship is broken is based on whether a start time indicated by the second issue user interface element for the second issue is earlier than an end time indicated by the first issue user interface element for the first issue.

18. The method of claim 14, wherein the determination that the update to the dependency relationship indicates that the dependency relationship is not broken is based on whether a start time indicated by the second issue user interface element for the second issue is later than an end time indicated by the first issue user interface element for the first issue.

19. The method of claim 14, wherein the determination that the update to the dependency relationship indicates that the dependency relationship is broken is based on whether a start date indicated by the second issue user interface element for the second issue is earlier than an end date indicated by the first issue user interface element for the first issue.

20. The method of claim 14, wherein the determination that the update to the dependency relationship indicates that the dependency relationship is not broken is based on whether a start date indicated by the second issue user interface element for the second issue is later than an end date indicated by the first issue user interface element for the first issue.

* * * * *